United States Patent
Moran et al.

(10) Patent No.: US 11,599,679 B2
(45) Date of Patent: Mar. 7, 2023

(54) ELECTROMAGNETIC AND POWER NOISE INJECTION FOR HARDWARE OPERATION CONCEALMENT

(71) Applicant: Arm Limited, Cambridge (GB)

(72) Inventors: Brendan James Moran, Histon (GB); Matthias Lothar Boettcher, Cambridge (GB)

(73) Assignee: ARM LIMITED, Cambridge (GB)

(*) Notice: Subject to any disclaimer, the term of this patent is extended or adjusted under 35 U.S.C. 154(b) by 213 days.

(21) Appl. No.: 16/908,853

(22) Filed: Jun. 23, 2020

(65) Prior Publication Data

US 2021/0397747 A1 Dec. 23, 2021

(51) Int. Cl.
*G06F 21/72* (2013.01)
*H04L 9/00* (2022.01)
*H04L 9/08* (2006.01)

(52) U.S. Cl.
CPC .......... *G06F 21/72* (2013.01); *H04L 9/003* (2013.01); *H04L 9/0869* (2013.01); *H04L 2209/046* (2013.01); *H04L 2209/08* (2013.01); *H04L 2209/12* (2013.01); *H04L 2209/16* (2013.01); *H04L 2209/20* (2013.01)

(58) Field of Classification Search
CPC ....... G06F 21/72; H04L 9/0869; H04L 9/003; H04L 2209/046; H04L 2209/08; H04L 2209/12; H04L 2209/20; H04L 2209/16
USPC .......................................................... 380/28
See application file for complete search history.

(56) References Cited

U.S. PATENT DOCUMENTS

| | | | | |
|---|---|---|---|---|
| 11,218,307 B1* | 1/2022 | Griffin | ............ | H04L 9/3247 |
| 2003/0059040 A1* | 3/2003 | Rose | ............ | H04L 9/065 |
| | | | | 380/1 |
| 2009/0327664 A1* | 12/2009 | Yoshimi | ............ | G06F 21/755 |
| | | | | 713/189 |
| 2011/0176674 A1* | 7/2011 | Romain | ............ | H04L 9/002 |
| | | | | 726/26 |
| 2011/0228926 A1* | 9/2011 | Shumow | ............ | H04L 9/003 |
| | | | | 380/1 |

(Continued)

OTHER PUBLICATIONS

International Search Report and Written Opinion issued in International Application No. PCT/GB2021/051547, dated Sep. 23, 2021, 14 pages.

*Primary Examiner* — Thanh T Le
(74) *Attorney, Agent, or Firm* — Talem IP Law, LLP (57) ABSTRACT

A method of operation concealment for a cryptographic system includes randomly selecting which one of at least two cryptographic operation blocks receives a key to apply a valid operation to data and outputs a result that is used for subsequent operations. Noise can be added by operating the other of the at least two cryptographic operation blocks using a modified key. The modified key can be generated by mixing the key with a block-unique-identifier, a device secret, a slowly adjusting output of a counter, or a combination thereof. In some cases, noise can be added to a cryptographic system by transforming input data of the other cryptographic operation block(s) by mixing the input data with the block-unique-identifier, device secret, counter output, or a combination thereof. A cryptographic system with operation concealment can further include a distributed (across a chip) or interweaved arrangement of subblocks of the cryptographic operation blocks.

18 Claims, 6 Drawing Sheets

(56) References Cited

U.S. PATENT DOCUMENTS

| | | | | |
|---|---|---|---|---|
| 2012/0005466 A1* | 1/2012 | Wagner | ............... | H04L 9/0625 |
| | | | | 713/189 |
| 2012/0087489 A1* | 4/2012 | Sekiya | ................... | H04L 9/003 |
| | | | | 380/28 |
| 2012/0173878 A1* | 7/2012 | Boehl | .................... | H04L 9/003 |
| | | | | 713/176 |
| 2013/0077790 A1* | 3/2013 | Kawabata | ............ | H04L 9/0631 |
| | | | | 380/28 |
| 2013/0259224 A1* | 10/2013 | Lee | ......................... | G06F 7/582 |
| | | | | 708/250 |
| 2014/0143883 A1* | 5/2014 | Shen-Orr | ............... | H04L 9/003 |
| | | | | 726/26 |
| 2015/0222421 A1* | 8/2015 | Guo | ....................... | H04L 9/003 |
| | | | | 380/28 |
| 2015/0270973 A1* | 9/2015 | Duplys | .................. | H04L 9/003 |
| | | | | 380/28 |
| 2016/0315760 A1* | 10/2016 | Gori | ....................... | H04L 9/003 |
| 2017/0288855 A1* | 10/2017 | Kumar | ................. | H04L 9/0631 |
| 2018/0131527 A1* | 5/2018 | Lu | ......................... | H04L 9/3278 |
| 2018/0373899 A1* | 12/2018 | Ordas | .................... | G06F 21/75 |
| 2019/0116023 A1 | 4/2019 | Kumar et al. | | |
| 2020/0004992 A1 | 1/2020 | Chong et al. | | |
| 2020/0012822 A1* | 1/2020 | Vineyard | ............... | H04W 12/12 |
| 2020/0014404 A1* | 1/2020 | Mendel | .................. | H04L 9/003 |
| 2020/0021427 A1* | 1/2020 | Montoya | ................. | H04L 9/004 |
| 2020/0110906 A1 | 4/2020 | Choi et al. | | |
| 2020/0380130 A1* | 12/2020 | Purushotham | ........ | G06F 12/145 |
| 2021/0194666 A1* | 6/2021 | Georgieva | ............. | H04L 9/008 |
| 2022/0083665 A1* | 3/2022 | Kocher | .................. | H04L 9/085 |

\* cited by examiner

ELECTROMAGNETIC AND POWER NOISE INJECTION FOR HARDWARE OPERATION CONCEALMENT

BACKGROUND

Side Channel Analysis (SCA), in particular Differential Power Analysis (DPA) and Electro-Magnetic Interference (EMI), provide sophisticated attackers with the ability to attack hardware cryptographic accelerators. With developments in Machine Learning, there is now a rise in Machine Learning (ML)-assisted DPA/EMI, which may not be easily mitigated by current defense measures.

BRIEF SUMMARY

Operation concealment features for cryptographic systems that produce electromagnetic and power noise during operations are provided. The noise can be strongly correlated with true signals of the operations. In some cases, the described techniques make it more difficult to target sensitive parts of a system on a chip by creating randomness across multiple device so that even if one device is able to be compromised and used to generate a model for ML assisted DPA/EMI, this model is not applicable to the other devices.

A method of operation concealment for a cryptographic system includes selecting which one of at least two cryptographic operation blocks receives a key to apply a valid operation to data and outputs a result that is fed back for a next round calculation. The selection may be accomplished using selection circuitry, such as multiplexers, controlled by a pseudorandom sequence generator or a truly random source, or be controlled programmatically. In some cases, noise can be added by transforming input data of the other of the at least two cryptographic operation blocks. In some cases, as an addition or as an alternative, noise can be added by operating these other of the at least two cryptographic operation blocks using a modified key. The modified key can be generated by mixing the key with a block-unique-identifier, a device secret, a slowly adjusting output of a counter, or a combination thereof. Various implementations of this method can result in a change in the noise patterns at several frequencies, which can interrupt a training cycle of machine learning models.

The use of the other cryptographic operation blocks during operation of the one performing the true, guarded operation can provide a correlated, unique, and appropriate magnitude electromagnetic emission that can mask that emitted by the true, guarded operation. In addition, by switching which cryptographic operation is performing the true, guarded operation, the correlated operations cannot simply be ignored by an attacker.

In some cases, a cryptographic system includes at least one cryptographic operation block distributed across a chip. For example, a cryptographic system can include a cryptographic operation block coupled to receive a key and apply an operation to data, wherein the cryptographic operation block comprises a plurality of subblocks and the subblocks of the cryptographic operation block are distributed across a chip with other blocks (e.g., secure or non-secure circuitry that may be used as part of the cryptographic system or for a different cryptographic or other system on the same chip) between them. In some cases, two or more cryptographic accelerators are proximate and intertwined/interweaved such that it is difficult to probe one of the cryptographic accelerators independently.

In some cases, a cryptographic system with operation concealment includes at least two cryptographic operation blocks; and circuitry coupled to the at least two cryptographic operation blocks that route inputs and outputs pseudo randomly, randomly, or programmatically between the at least two cryptographic operation blocks. In some cases, the circuitry can include selection circuitry, such as multiplexers, and a pseudorandom sequence generator.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Operation concealment features for cryptographic systems that produce electromagnetic and power noise during operations are provided. The noise can be strongly correlated with true signals of the operations. In some cases, the described techniques and configurations make it more difficult to target sensitive parts of a system on a chip by creating randomness across multiple device so that even if one device is able to be compromised and used to generate a model for ML assisted DPA/EMI, this model is not applicable to the other devices.

Various levels of operation concealment are provided for cryptographic systems. The described operation concealment features are applicable to symmetric ciphers, asymmetric ciphers/public key exchange algorithms, cryptographic hashes, and other security critical algorithms.

Typically, in order to achieve high performance in accelerators and other circuitry, components are laid out in close proximity to each other to minimize the distance between these components and thereby limit transmission latencies and energy consumption. In contrast to this approach, in some implementations, a mitigation mechanism includes spreading parts of a circuit handling sensitive information out over the chip so that it is difficult to pick up the sensitive information from a probe in one spot. Instead attackers would have to pick up emissions from all over the chip and algorithmically combine them to restore said information.

Thus, instead of using a single small probe that is able to specifically target one area of a chip that is strongly correlated with cryptographic operations, an attacker will be required to probe multiple areas or even the entire chip and correlate those measurements while filtering out the greater number of noise sources. This type of arrangement in layout is suitable for applications where the increased latency from the spread out (including due to slower clocking and lower drive strength applied to minimize effects of additional EMI due to the long wires between some of the subblocks) is acceptable in view of the increased security. For example, a cloud hosted hardware security module (HSM) can implement the described layout arrangement for the underlying physical hardware security module that handles a long term key used to sign the keys created by fairly trusted environments (e.g., virtual machines or a regular computing device). The physical hardware security module may then be used for the highest level of security and other operations can be delegated to the faster processors. A second example is a mobile device that evaluates PIN/password entry and financial transactions slowly, and securely, while computing less critical operations faster but less secure.

Accordingly, in some implementations, instead of making cryptographic operations temporally diffuse (e.g., through clock shifting, dummy operations, etc.), the cryptographic accelerator can be made spatially diffuse. This can be performed for a single accelerator that is split up into subblocks disposed in different regions or by using multiple instances of an accelerator for the same data, where the multiple instances are disposed in different regions (and optionally interweaved together).

In some of such cases, an automated place and route tool chain can include a security layout function that, instead of adjusting layout for efficiencies between communicating between elements, spreads out the circuitry handling the sensitive operation across a chip in order to make it more difficult to pick up signals from that circuitry. In some cases, the circuitry that is specifically directed to spread out are the cryptographic computation blocks.

In some implementations, a configuration is provided that can actively confound the operations of machine learning networks by inserting extra information into the emissions that do not reveal sensitive information, but that can be strongly correlated with that sensitive information. In some cases, the extra information is made different for different devices so that even if a model is able to be created for a device compromised by an attacker to train said model, this same model will not work on another device. The use of the other cryptographic operation blocks during operation of the one performing the true, guarded operation can provide a correlated, unique, and appropriate magnitude electromagnetic emission that can mask that emitted by the true, guarded operation. In addition, by switching which cryptographic operation is performing the true, guarded operation, the correlated operations cannot simply be ignored by an attacker.

Inserting extra information into the emissions can be carried out by using multiple instances of the same cryptographic accelerator, where the instances may be spread in multiple regions across the SoC. For example, a system can include at least two cryptographic operation blocks; and circuitry coupled to the at least two cryptographic operation blocks that route inputs and outputs between the at least two cryptographic operation blocks for subsequent computations. The circuitry can support pseudorandom, random, or programmatic selection of inputs and outputs. Dummy operations can be executed on all but one cryptographic accelerator, where the non-dummy operations are protected by the emissions from the dummy operations. This approach can also provide additional cryptographic computing resources when used for lower security operations (e.g., where DPA/EMI attacks are not a concern).

Figure 9A:
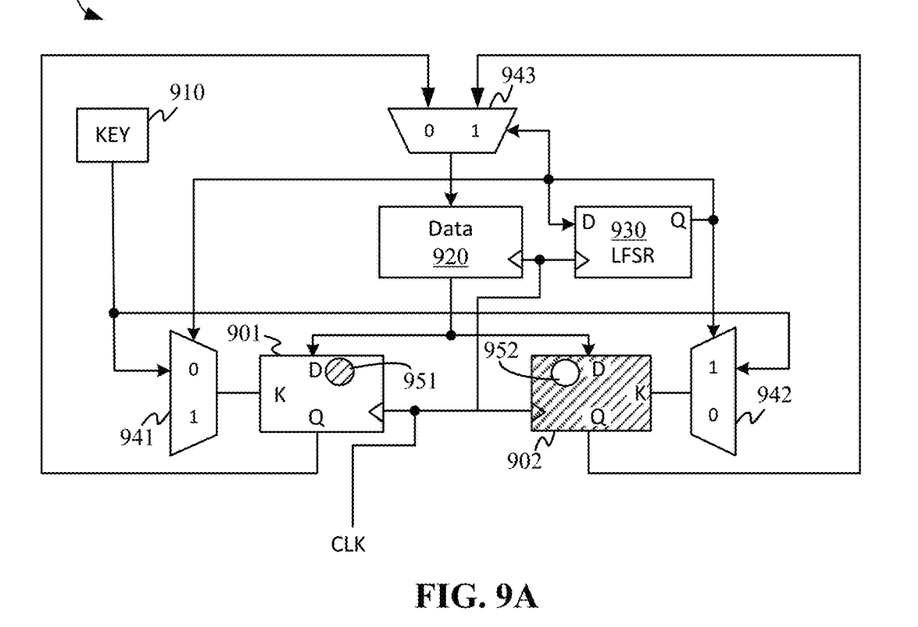
FIG. 9A illustrates an example operation concealment configuration for a cryptographic system with interweaved layout.
Figure 9B:
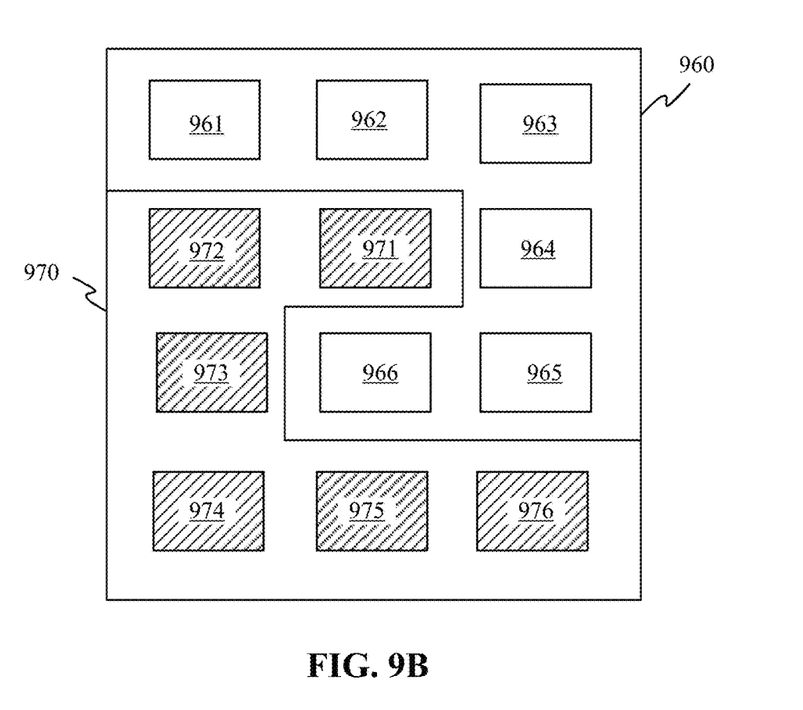
FIGS. 9B and 9C illustrate example representations of interweaving layouts for cryptographic operation blocks.

It is also possible to intertwine/interweave two or more cryptographic accelerators so that they are spatially collocated and operations in one cannot be distinguished from operations in the other when observed using EMI or DPA techniques (see e.g., FIG. 9B). This can make it difficult to probe one of the cryptographic accelerators independently of the other(s).

As mentioned above, the described operation concealment configurations are suitable for a number of different cryptographic systems with cryptographic operation blocks. One such cryptographic system is the AES cryptographic system.

Figure 1:
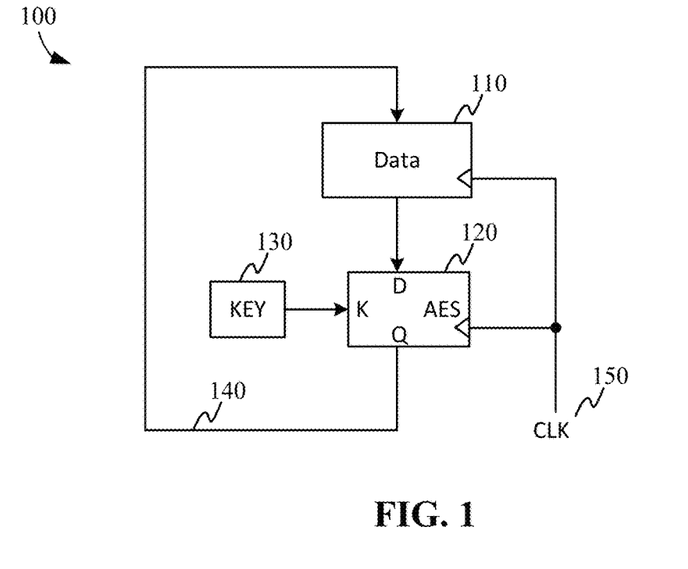
FIG. 1 illustrates a standard AES core configuration.

FIG. 1 illustrates a standard AES core configuration. In a standard AES core configuration 100, data 110 is input to an AES calculator 120 that encrypts (or decrypts) the data 110 based on a key 130. The AES calculator 120 represents the hardware that calculates one AES round. The output of a round is fed back 140 to undergo another round of calculations at the AES calculator 120 until the total number of rounds (e.g., 12 rounds) for a particular operation is completed. Each data block can be encrypted (or decrypted) in a certain number of clock cycles (e.g., 12 cycles from CLK 150).

Figure 2:
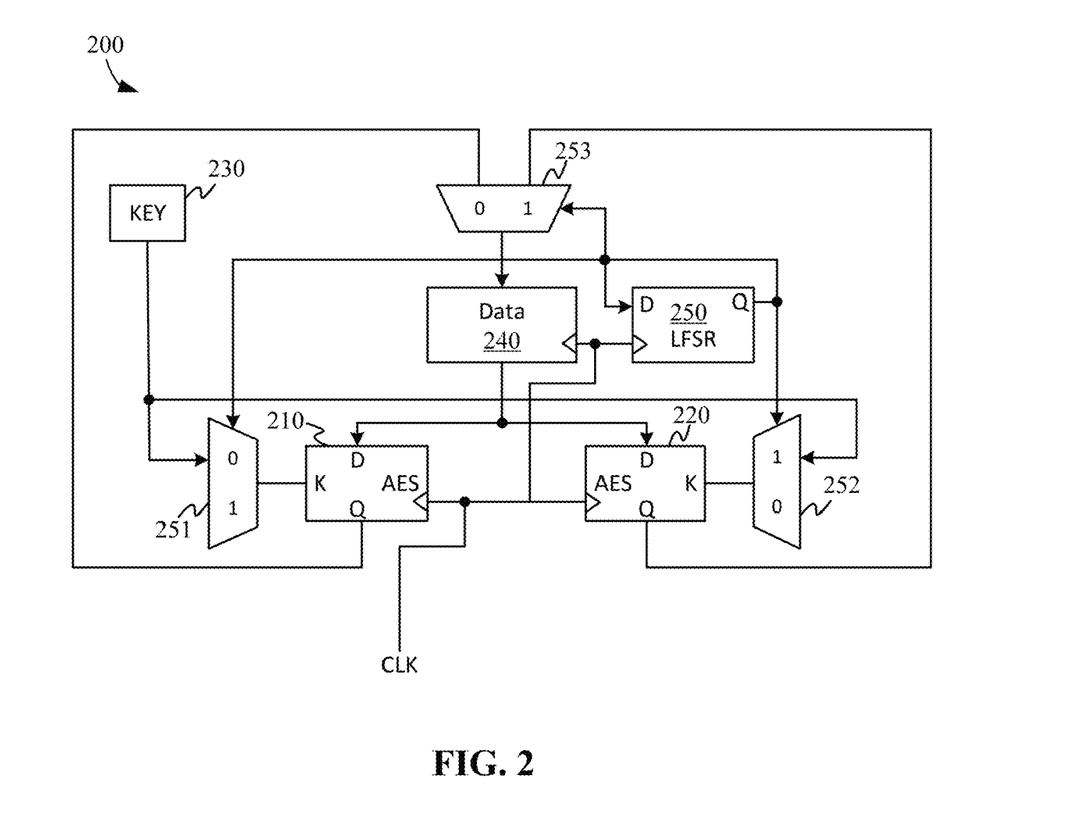
FIG. 2 illustrates a first example operation concealment configuration for a cryptographic system.

FIG. 2 illustrates a first example operation concealment configuration for a cryptographic system. Referring to FIG. 2, in a first level of operation concealment, an operation concealment configuration 200 can include at least two cryptographic operation blocks: a first AES calculator 210 and a second AES calculator 220; and circuitry coupled to the at least two cryptographic operation blocks that route inputs and outputs between the at least two cryptographic operation blocks. The circuitry includes selection circuitry and, in this illustration, a pseudorandom sequence generator (PRSG). Of course, in other implementations, a truly random source may be used or a programmatic sequence may be used in place of the PRSG. In this implementation, the first and second AES calculators 210, 220 use the same key 230 to perform calculations on data 240 where each round is performed by one of the two AES calculators 210, 220 according to a control signal from a PRSG in the form of a linear feedback shift register (LFSR) 250, and selection circuitry including a plurality of multiplexers (MUXs). The LFSR 250 provides the signal that controls which branch each multiplexer (MUX) takes so that cryptographic operations are randomly migrated from block to block (between the two AES calculators 210, 220). For example, a first MUX 251 can be used to select whether the key 230 is input to the first AES calculator 210 and a second MUX 252 can be used to select whether the key 230 is input to the second AES calculator 220 under control of the LFSR 250. A third MUX 253 can be used to select which output is fed back for the next round calculation (or subsequent computation) under control of the LFSR 250. In some cases, the cryptographic operation is still performed by both blocks using the data 240; however, only one has the key 230. Here, each of the at least two cryptographic operation blocks perform operations at a same time, and the circuitry selects which output of the at least two cryptographic operation blocks is used for subsequent computations.

A method of operation concealment using configuration 200 includes selecting, via a corresponding MUX (e.g., first MUX 251, second MUX 252) controlled by a PRSG (e.g., LFSR 250), which of at least two cryptographic operation blocks (e.g., AES calculator 210, AES calculator 220) receive a key (e.g., key 230) to apply a valid operation to data (e.g., data 240); and selecting, via a third MUX 253 controlled by the PRSG, which output of the at least two cryptographic operation blocks (e.g., AES calculator 210, AES calculator 220) is fed back for a next round calculation.

Figure 3:
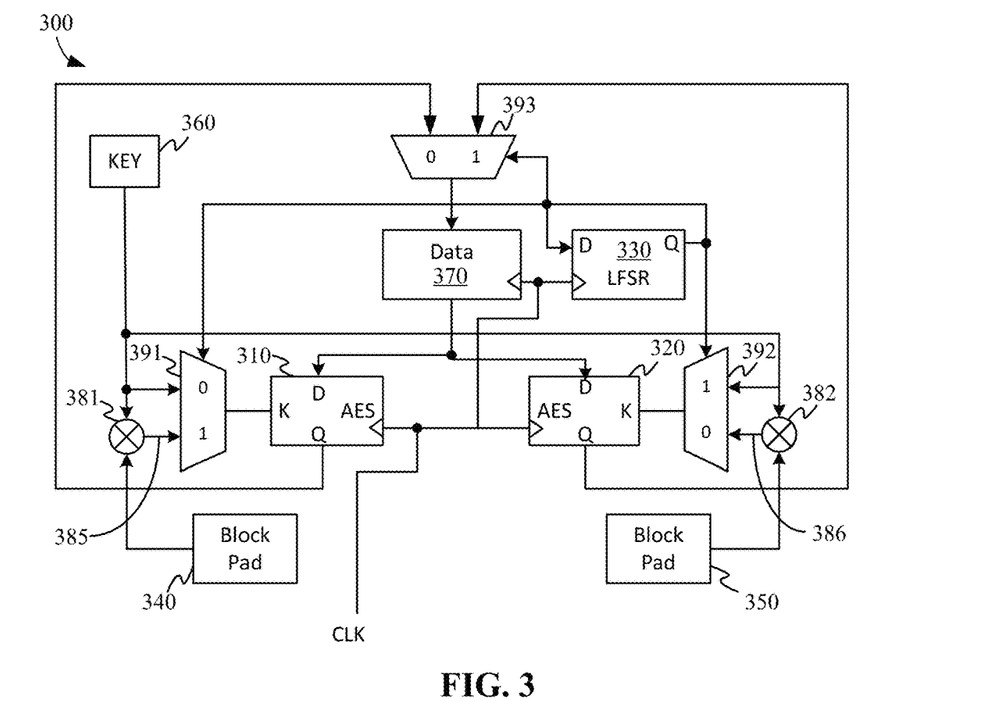
FIG. 3 illustrates a second example operation concealment configuration for a cryptographic system.

FIG. 3 illustrates a second example operation concealment configuration for a cryptographic system. Referring to FIG. 3, in a second level of operation concealment, an operation concealment configuration 300 can include at least two cryptographic operation blocks: a first AES calculator 310 and a second AES calculator 320; and circuitry coupled to the at least two cryptographic operation blocks that route inputs and outputs between the at least two cryptographic operation blocks. The circuitry includes selection circuitry and, in this illustration, a PRSG in the form of a LFSR 330. Of course, in other implementations, a truly random source may be used or a programmatic sequence (provided via, for example, a shift register) may be used in place of the LFSR 330. During operation, each subsequent computation (e.g., AES round) is performed by one of the two AES calculators 310, 320 according to a control signal from LFSR 330, and selection circuitry including a plurality of MUXs, similar to the configuration 200 of FIG. 2. However, in this implementation, a first block pad 340 and a second block pad 350 are included to transform the key 360. The block pads 340, 350 can provide a unique identifier (a "block-unique-identifier") for each primitive (and each block on a SoC has a pad, but the block-unique identifier may be shared across all SoCs). That is, the block-unique-identifier can be unique for each hardware block, but can be part of a generic design that is replicated for all devices of the same type. For example, for a device with two cryptographic operation blocks such as illustrated here in FIG. 3, each block pad (e.g., first block pad 340 and second block pad 350) of configuration 300 is provided with a unique identifier (e.g., a first block-unique-identifier and a second block-unique-identifier). This ensures that the modified keys provided to either cryptographic operation block differ. In some cases, the block pads 340, 350 provide the same block-unique-identifier or are implemented as a single block pad that supplies the same block-unique-identifier for both AES calculators 310, 320.

The two AES calculators use the key 360 when actively performing the real calculations on the data 370 and use their respective block pad 340, 350 to modify the key 360 so emissions occur even when not selected to operate on the real data. A first combiner 381 is used to transform the key 360 with the signal from the first block pad 340 to generate a first modified key 385 and a second combiner 382 is used to transform the key 360 with the signal from the second block pad 350 to generate a second modified key 386. In some cases, the first modified key 385 and the second modified key 386 are the same value. The combiners 381, 382 may be any suitable circuitry for combining the two signals. For example, a combiner can be a gate performing a logical or arithmetic operation on its inputs to derive the output, such as an XOR gate, or a hash function that can be used to combine the signals and output a modified key 385, 386. In operation, the LFSR 330 provides the signal that controls which branch each MUX takes. For example, a first MUX 391 can be used to select whether the key 360 or the first modified key 385 is input to the first AES calculator 310 and a second MUX 392 can be used to select whether the key 360 or the second modified key 386 is input to the second AES calculator 320 under control of the LFSR 330. A third MUX 393 can be used to select which output is fed back for the next round calculation (or subsequent computation) under control of the LFSR.

A method of operation concealment using configuration 300 includes mixing a block-unique-identifier (e.g., first block pad 340 or second block pad 350) with a key (e.g., key 360) to output a modified key (e.g., modified key 385, 386); selecting, via a corresponding MUX (e.g., first MUX 391 or second MUX 392) controlled by a PRSG (e.g., LFSR 330), which of at least two cryptographic operation blocks (e.g., AES calculator 310 or AES calculator 320) receive the key (e.g., key 360) to apply a valid operation to data (e.g., data 370), where the corresponding MUXs select between the key and the modified key for each of the at least two cryptographic operation blocks; and selecting, via a third MUX 393 controlled by the PRSG, which output of the at least two cryptographic operation blocks (e.g., AES calculator 310 or AES calculator 320) is fed back for a next round calculation.

By performing calculations with both AES calculators, where one is using the correct key and the other is using a transformed/modified key, it can be more challenging for an attacker to know which signal is indicative of the correct key. In the configuration of FIG. 3, although the block pads provide obfuscation of the key and which AES calculation is the correct one, if an attack does eventually learn how to differentiate between the valid key and the transformed key operations, it may be able to be applied to other devices using the same block pad configuration (e.g., because block pads can be shared between devices). Therefore, in another operation concealment configuration, each device uses its own device secret to modify the key.

Figure 4:
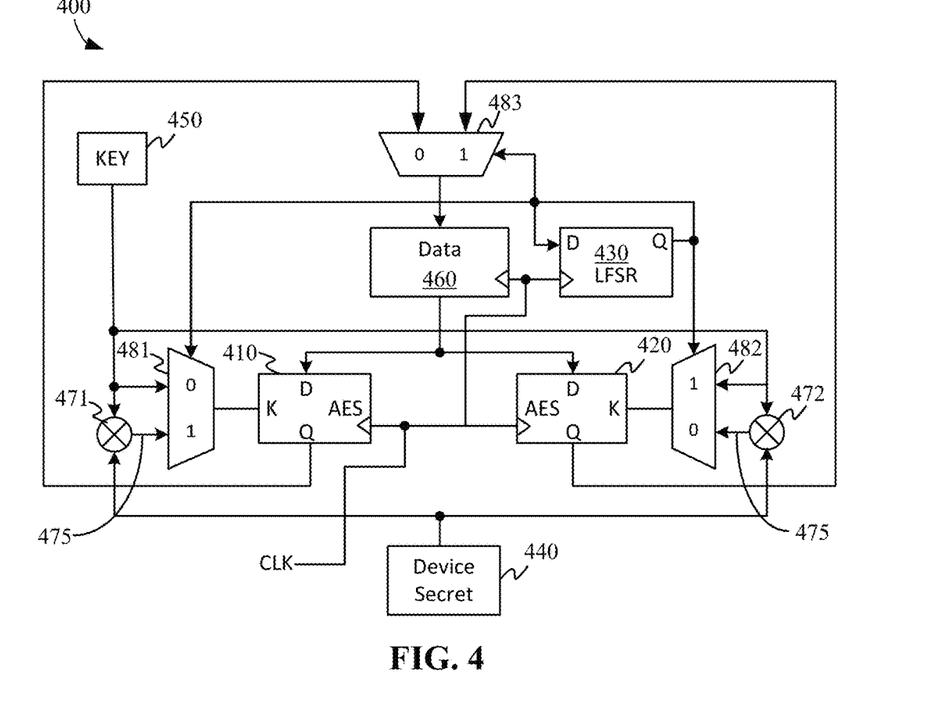
FIG. 4 illustrates a third example operation concealment configuration for a cryptographic system.

FIG. 4 illustrates a third example operation concealment configuration for a cryptographic system. Referring to FIG. 4, in a third level of operation concealment, an operation concealment configuration 400 can include at least two cryptographic operation blocks: a first AES calculator 410 and a second AES calculator 420; and circuitry coupled to the at least two cryptographic operation blocks that route inputs and outputs between the at least two cryptographic operation blocks. The circuitry includes selection circuitry and, in this illustration, a PRSG in the form of a LFSR 430. Of course, in other implementations, a truly random source may be used or a programmatic sequence (provided via, for example, a shift register) may be used in place of the LFSR 430 may be used. During operation, each subsequent computation (e.g., AES round) is performed by one of the two AES calculators 410, 420 according to a control signal from LFSR 430, and selection circuitry including a plurality of MUXs, similar to the configurations 200 of FIGS. 2 and 300 of FIG. 3. However, in this implementation, a device secret 440 is included to transform the key 450.

The two AES calculators use the key 450 when actively performing the real calculations on the data 460 and use the device secret 440 to modify the key 450 so emissions occur even when not selected to operate on the real data. In the illustrated example, a first combiner 471 is used to transform the key 450 with the signal from the device secret 440 and a second combiner 472 is used to transform the key 450 with the signal from the device secret 440 to generate a modified key 475. The combiners 471, 472 may be embodied as a single combiner or two separate combiners outputting a same signal. The combiners 471, 472 may be any suitable circuitry for combining the two signals. For example, a gate performing a logical or arithmetic operation on its inputs to derive the output, such as an XOR gate, or a hash function that is used to combine the signals and output the modified key 475. In operation, the LFSR 430 provides the signal that controls which branch each MUX takes. For example, a first MUX 481 can be used to select whether the key 450 or the modified key 475 is input to the first AES calculator 410 and a second MUX 482 can be used to select whether the key 450 or the modified key 475 is input to the second AES calculator 420 under control of the LFSR 430. A third MUX 483 can be used to select which output is fed back for the next round calculation (or subsequent computation) under control of the LFSR 430.

A method of operation concealment using configuration 400 includes mixing a device secret (e.g., device secret 440) with a key (e.g., key 450) to output a modified key (e.g., modified key 475); selecting, via a corresponding MUX (e.g., first MUX 481 or second MUX 482) controlled by a PRSG (e.g., LFSR 430), which of at least two cryptographic operation blocks (e.g., AES calculator 410 or AES calculator 420) receive the key (e.g., key 450) to apply a valid operation to data (e.g., data 460), where the corresponding MUXs select between the key and the modified key for each of the at least two cryptographic operation blocks; and selecting, via a third MUX 483 controlled by the PRSG, which output of the at least two cryptographic operation blocks (e.g., AES calculator 410 or AES calculator 420) is fed back for a next round calculation.

By performing calculations with both cryptographic operation blocks, where one is using the correct key and the other is using a transformed/modified key, it can be more challenging for an attacker to know which signal is indicative of the correct key. In addition, the device secret 440 can make an attack not portable between individual devices. The device secret 440 can be a fixed value/number or a value derived from an internal measurement of the system (e.g., something separately inside the device that is measured such as a transistor threshold value). For example, when the chip is fabricated, there may be process variation between chips on a die and between dies not just due to position on the die, but also due to potentially different temperature and humidity in the air between hours and days. The device secret does not have to be absolutely unique; rather, just unique enough between devices. That is, the device secret is sufficiently unpredictable to stop a small number of devices (e.g., 1-10 or less than 100) from being used to create an attack that is portable to a large number of devices (e.g., more than the small number used to train an attack)

As indicated above, a device with the block pad configuration may be compromised. Similarly, it may be possible for a device with the device secret configuration to be compromised. To make it even more difficult for an attack to be repeatedly successful against a particular device even if it is subject to a successful compromise, an operation concealment configuration can further include a counter to update the value output by the block pad or the device secret. This may be considered a fourth level of concealment. The counter can update very slowly. The "slowness" of the update is set to be sufficient so that the change is not just noise that can be easily averaged out. As an example, if the counter updated every thousand cycles, this results in data that was collected over the thousand cycles to not be applicable for the next thousand cycles. Even if a machine learning DPA/EMI attack is able to make a good prediction in 100 cycles, the attack will only have 900 more cycles to extract the secrets because then the information the attack is picking up will no longer match the pattern it learned.

Figure 5A:
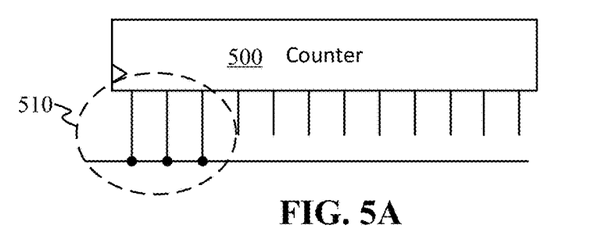
FIGS. 5A and 5B illustrate counter configurations for a cryptographic system with operation concealment.
Figure 5B:
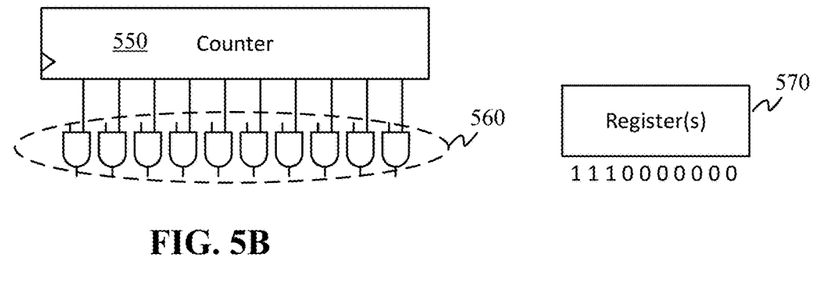

FIGS. 5A and 5B illustrate counter configurations for a cryptographic system with operation concealment. As described above, a counter may be used to slowly adjust a value used to transform a key. Although all the counter bits may be used to update the count, only the coupled ones are taken into account when computing the block pad and/or device secret. In some cases, the bits used by the system from the counter can be adjusted. For example, if there is a report that an attacker is able to train their SCA attack on 500 repetitions, then more or fewer bits of the counter can be used depending on the desired effect (e.g., to not permit 500 repeated actions without a change or to allow the 500 repeated actions and then change).

In one implementation, such as illustrated in FIG. 5A, just the high bits of a counter 500 are coupled to a combiner to be used to modify the block pad and/or the device secret. In this case, the coupling may be hard-wired 510 to each of the bits to be used. In some cases, the coupling may be selectable, for example by a switch coupled to each bit or a logic gate, such as an AND gate, as illustrated in FIG. 5B, where counter 550 has a set of AND gates 560 coupled to each bit to mask the bits not used. The other input of each AND gate can be controlled by a corresponding value in register(s) 570. The register 570 may be updated programmatically to change which bits are used. In another implementation (not shown), a shift register may be used instead of switches or an AND gate to determine how may bits to shift by before using its output.

Applying a counter to the configuration 300 of FIG. 3 can include mixing a count value from the counter with the block-unique-identifier (e.g., from first block pad 340 or second block pad 350) and the key (e.g., key 360) before outputting the modified key (e.g., first modified key 385 or the second modified key 386), wherein the count value ignores the least significant bits of the counter. In some cases, which of the least significant bits of the counter to ignore can be adjusted.

Applying a counter to the configuration 400 of FIG. 4 can include mixing a count value from the counter with the device secret (e.g., device secret 440) and the key (e.g., key 450) before outputting the modified key (e.g., modified key 475), wherein the count value ignores the least significant bits of the counter. Similar to the example above, in some cases, which of the least significant bits of the counter to ignore can be adjusted.

Figure 6:
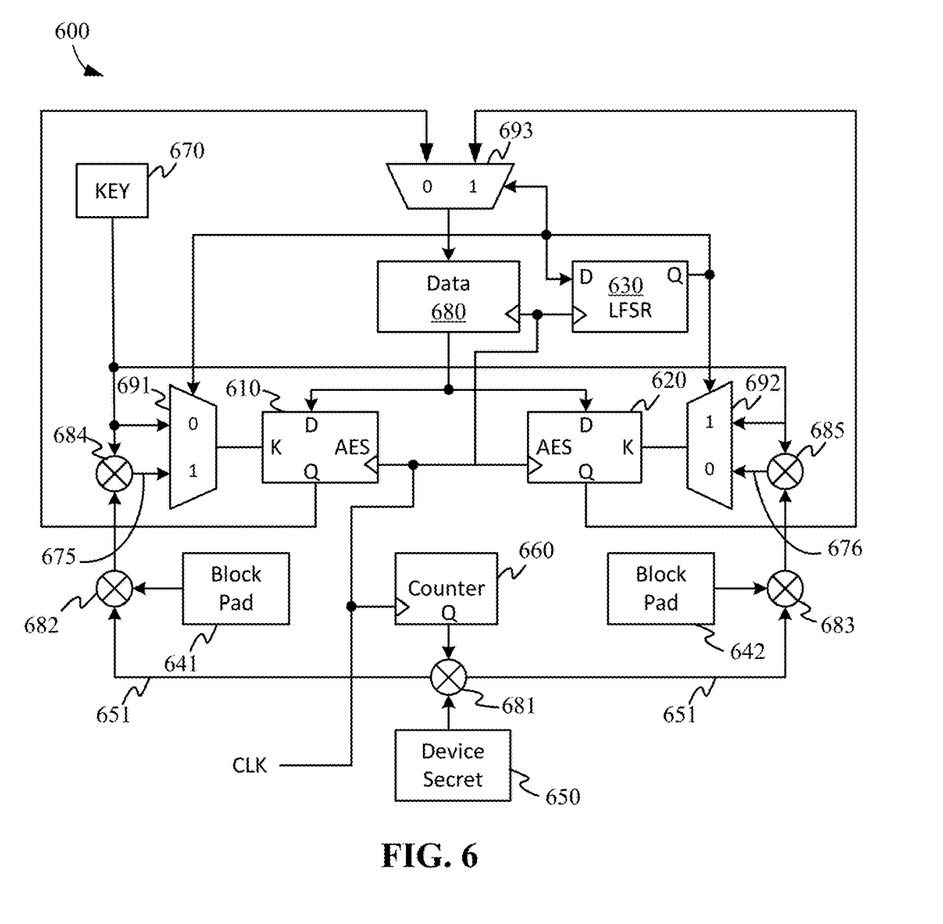
FIG. 6 illustrates a fourth example operation concealment configuration for a cryptographic system.

FIG. 6 illustrates a fourth example operation concealment configuration for a cryptographic system. Referring to FIG. 6, the various concealment features described above can be combined as illustrated by operation concealment configuration 600. Operation concealment configuration 600 can include at least two cryptographic operation blocks: a first AES calculator 610 and a second AES calculator 620; and circuitry coupled to the at least two cryptographic operation blocks that route inputs and outputs between the at least two cryptographic operation blocks. The circuitry includes selection circuitry and, in this illustration, a PRSG in the form of a LFSR 630. Of course, in other implementations, a truly random source may be used or a programmatic sequence (provided via, for example, a shift register) may be used in place of the LFSR 630 may be used. During operation, each subsequent computation (e.g., AES round) is performed by one of the two AES calculators 610, 620 according to a control signal from LFSR 630, and selection circuitry including a plurality of MUXs, similar to the configurations 200 of FIG. 2, 300 of FIG. 3, and 400 of FIG. 4. In the implementation of operation concealment configuration 600, both block pads (e.g., first block pad 641 and a second block pad 642), a device secret 650, and a counter 660 are included to transform the key 670.

The two AES calculators 610, 620 use the key 670 when actively performing the real calculations on the data 680 and use the block pads 641, 642, device secret 650, and counter 660 to modify the key 670 so emissions occur even when that calculator is not selected to operate on the real data.

In the illustrated configuration, a first combiner 681 is used to combine the output of counter 660 with the device secret 650 to output a time-varying device secret 651; a second combiner 682 is used to combine the time-varying device secret 651 with the output from the first block pad 641; a third combiner 683 is used to combine the time-varying device secret 651 with the output from the second block pad 642; a fourth combiner 684 is used to transform the key 670 with the signal from the second combiner 682 to generate a first modified key 675; and a fifth combiner 685 is used to transform the key 670 with the signal from the third combiner 683 to generate a second modified key 676. In some cases, the first modified key 675 and the second modified key 676 are the same value. The combiners 681, 682, 683, 684, and 685 may be any suitable circuitry for combining the two signals. For example, a combiner can be a gate performing a logical or arithmetic operation on its inputs to derive the output, such as an XOR gate, or a hash function that can be used to combine the signals and output a modified key 675, 676. In the illustrated implementation, the counter 660 is coupled to the first combiner 681, which mixes the output of the counter 660 with the device secret 650. However, in some cases, the output of the counter 660 is coupled to first combine with the block pads (e.g., via combiners 682 and 683, where the device secret is then combined using the same or different combiners) so that the block pad output is mixed with the counter output first before being mixed with the device secret.

In operation, the LFSR 630 provides the signal that controls which branch each MUX takes. For example, a first MUX 691 can be used to select whether the key 670 or the first modified key 675 is input to the first AES calculator 610 and a second MUX 692 can be used to select whether the key 670 or the second modified key 676 is input to the second AES calculator 620 under control of the LFSR 630. A third MUX 693 can be used to select which output is fed back for the next round calculation (or subsequent computation) under control of the LFSR 630.

A method of operation concealment using configuration 600 includes mixing a count value from a counter (e.g., counter 660), a device secret (e.g., device secret 650), a block-unique-identifier (e.g., from first block pad 641 or second block pad 642), and a key (e.g., key 670) to output a modified key (e.g., modified key 675, 676); selecting, via a corresponding MUX (e.g., first MUX 691 or second MUX 692) controlled by a PRSG (e.g., LFSR 630), which of at least two cryptographic operation blocks (e.g., AES calculator 610 or AES calculator 620) receive the key (e.g., key 670) to apply a valid operation to data (e.g., data 680), where the corresponding MUXs (e.g., first MUX 691 or second MUX 692) select between the key (e.g., key 670) and the modified key (e.g., modified key 675) for each of the at least two cryptographic operation blocks; and selecting, via a third MUX 693 controlled by the PRSG, which output of the at least two cryptographic operation blocks (e.g., AES calculator 610 or AES calculator 620) is fed back for a next round calculation.

Although discrete combiners are illustrated in FIGS. 2, 3, 4, and 6, in some cases, fewer or more discrete combiners may be used to combine the appropriate signals. For example, with respect to the implementation illustrated in FIG. 6, one or more combiners can be coupled to a key output (e.g., key 670), the counter (e.g., counter 660), the device secret output (e.g., device secret 650), the first block pad 641, and the second block pad 642 to derive a corresponding output, including a modified key (e.g., modified key 675, 676). The selection circuitry (e.g., MUXs 691, 692, 693) is coupled to receive the modified key and the key output and select whether a key from the key output or the modified key is output to the first cryptographic operation block and the second cryptographic operation block (e.g., AES calculator 610 or AES calculator 620) under control of the LFSR 630. The one or more combiners can be implemented with a single combiner, for example, in the form of a 5-input adder.

In another embodiment that can be carried out using any of the illustrated system configurations, for any given operation, the system can select, using the PRSG, either the legitimate data or the data with the modified key. An accumulator can be included to count how many legitimate operations have been performed and weight the PRSG towards the legitimate key if too many operations with the modified key have occurred or weight the PRSG towards the modified key if too many legitimate operations have occurred. Alternatively, the pseudo-random sequence (or programmatic sequence) can be computed in advance to ensure good distribution between legitimate key and modified key, then loaded into a shift register, and shifted out at each step.

In some cases, the input data is transformed instead of or in addition to the key. By transforming the input data, it is possible to counter data extraction attacks. In some cases, two or more data storage blocks are used in order to store the data of a calculation step where a single cryptographic operation block is used (but distributed). In some cases, at least two cryptographic operation blocks are used.

Figure 7:
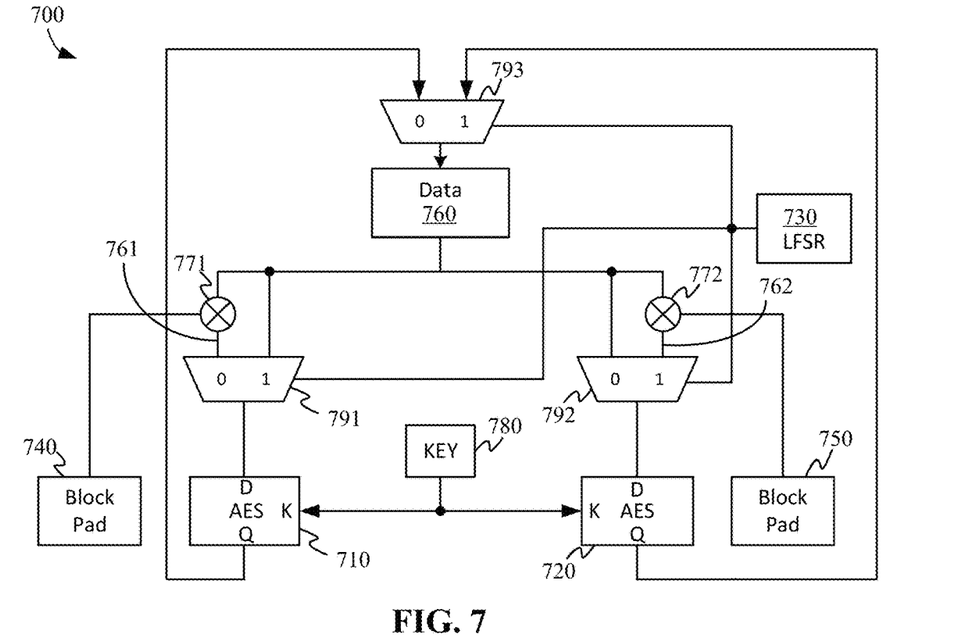
FIG. 7 illustrates an example configuration for a cryptographic system with data extraction mitigation.

FIG. 7 illustrates an example configuration for a cryptographic system with data extraction mitigation. Here, data is transformed by the block pads, rather than the key. In some cases, such as shown in the example of FIG. 7, a cryptographic system 700 with data extraction mitigation can include at least two cryptographic operation blocks: a first AES calculator 710 and a second AES calculator 720; and circuitry coupled to the at least two cryptographic operation blocks that route inputs and outputs between the at least two cryptographic operation blocks. The circuitry includes selection circuitry and, in this illustration, a PRSG in the form of a LFSR 730. Of course, in other implementations, a truly random source may be used or a programmatic sequence (provided via, for example, a shift register) may be used in place of the LFSR 730. A first block pad 740 and a second block pad 750 are included to transform the input data 760. The block pads 740, 750 can provide a unique identifier (a "block-unique-identifier") for each primitive (and each block on a SoC has a pad, but the block-unique identifier may be shared across all SoCs). That is, the block-unique-identifier can be unique for each hardware block, but can be part of a generic design that is replicated for all devices of the same type. For example, for a device with two cryptographic operation blocks such as illustrated here in FIG. 7, each block pad (e.g., first block pad 740 and second block pad 750) of configuration 700 is provided with a unique identifier (e.g., a first block-unique-identifier and a second block-unique-identifier). The block-unique identifier is used to modify the input data 760 using a combiner (e.g., combiners 771, 772). The combiners 771, 772 may be any suitable circuitry for combining the two signals. For example, a combiner can be a gate performing a logical or arithmetic operation on its inputs to derive the output, such as an XOR gate, or a hash function that can be used to combine the signals and output a modified input data 761, 762.

During operation, a key 780 is provided to the AES calculators 710, 720 and each subsequent computation (e.g., AES round) is performed by one of the two AES calculators 710, 720 according to a control signal from LFSR 730, and selection circuitry including a plurality of MUXs (e.g., first MUX 791, second MUX 792, and third MUX 793).

For example, the first MUX 791 can be used to select whether the input data 760 or the modified input data 761 is input to the first AES calculator 710, the second MUX 792 can be used to select whether the input data 760 or the modified input data 762 is input to the second AES calculator 720, and the third MUX 793 can be used to select which output is fed back for the next round calculation (or subsequent computation), all under control of the LFSR 730. Here, each of the at least two cryptographic operation blocks perform operations at a same time, and the circuitry selects which output of the at least two cryptographic operation blocks is used for subsequent computations.

A method of data extraction mitigation using configuration 700 includes mixing a block-unique-identifier (e.g., first block pad 740 or second block pad 750) with the input data (e.g., data 760) to output a modified input data (e.g., modified input data 761, 762); selecting, via a corresponding MUX (e.g., first MUX 791, second MUX 792) controlled by a PRSG (e.g., LFSR 730), which of at least two cryptographic operation blocks (e.g., AES calculator 710 or AES calculator 720) receive the input data (e.g., data 760) for a valid operation, where the corresponding MUXs select between the input data and the modified input data for each of the at least two cryptographic operation blocks; and selecting, via a third MUX 793 controlled by the PRSG, which output of the at least two cryptographic operation blocks (e.g., AES calculator 710 or AES calculator 820) is fed back for a next round calculation.

Figure 8:
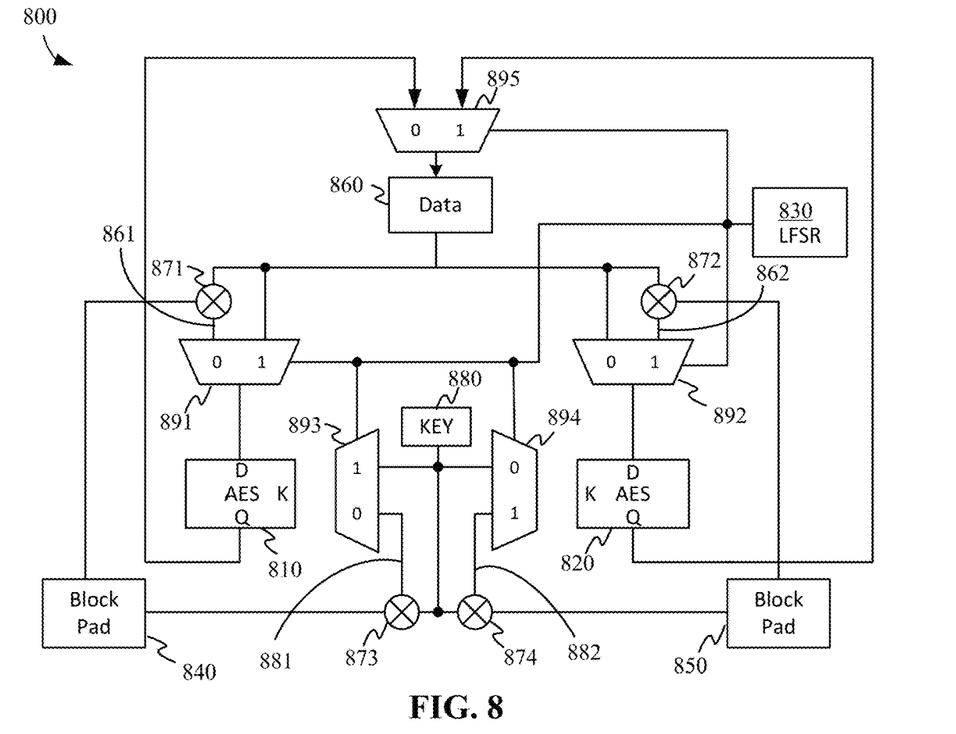
FIG. 8 illustrates an example configuration for a cryptographic system incorporating both operation concealment and data extraction mitigation.

FIG. 8 illustrates an example configuration for a cryptographic system incorporating both operation concealment and data extraction mitigation. Referring to FIG. 8, the example configuration 800 can include at least two cryptographic operation blocks: a first AES calculator 810 and a second AES calculator 820; and circuitry coupled to the at least two cryptographic operation blocks that route inputs and outputs between the at least two cryptographic operation blocks. The circuitry includes selection circuitry and, in this illustration, a PRSG in the form of a LFSR 830. Of course, in other implementations, a truly random source may be used or a programmatic sequence (provided via, for example, a shift register) may be used in place of the LFSR 830. A first block pad 840 and a second block pad 850 are included to transform the input data 860, such as described with respect to FIG. 7. However, in addition to being used to transform the input data 860 by using combiners 871 and 872, the block pads 840, 850 are also used to transform the key 880 such as described with respect to FIG. 3. In particular, block-unique identifiers from the block pads 840, 850 are used to modify the key 880 into a first modified key 881 and a second modified key 882 using combiners 873, 874). The combiners 871, 872, 873, 874 may be any suitable circuitry for combining the two signals. For example, a combiner can be a gate performing a logical or arithmetic operation on its inputs to derive the output, such as an XOR gate, or a hash function that can be used to combine (and transform) the signals and output modified input data 861, 862 and modified keys 881, 882.

During operation, each subsequent computation (e.g., AES round) is performed by one of the two AES calculators 810, 820 according to a control signal from LFSR 830, and selection circuitry including a plurality of MUXs (e.g., first MUX 891, second MUX 892, third MUX 893, fourth MUX 894, and fifth MUX 895). In operation, the LFSR 830 provides the signal that controls which branch each MUX takes. For example, the first MUX 891 can be used to select whether the input data 860 or the modified input data 861 is input to the first AES calculator 810, the second MUX 892 can be used to select whether the input data 860 or the modified input data 862 is input to the second AES calculator 820, a third MUX 893 can be used to select whether the key 880 or the first modified key 881 is input to the first AES calculator 810, the fourth MUX 894 can be used to select whether the key 880 or the second modified key 882 is input to the second AES calculator 820, and the fifth MUX 895 can be used to select which output of the AES calculators is fed back for the next round calculation (or subsequent computation), all under control of the LFSR 830.

A method of operation concealment and data extraction mitigation using configuration 800 includes mixing a block-unique-identifier (e.g., first block pad 840 or second block pad 850) with the input data (e.g., data 860) to output a modified input data (e.g., modified input data 861, 862) and mixing the block-unique-identifier (e.g., first block pad 840 or second block pad 850) with a key (e.g., key 880) to output a modified key (e.g., modified key 385, 386); selecting, via a corresponding MUX (e.g., first MUX 891, second MUX 892, third MUX 893, and fourth MUX 894) controlled by a PRSG (e.g., LFSR 830), which of at least two cryptographic operation blocks (e.g., AES calculator 810 or AES calculator 820) receive the input data (e.g., data 860) and the key (e.g., key 880) for a valid operation, where the corresponding MUXs select between the input data and the modified input data and between the key and the modified key for each of the at least two cryptographic operation blocks; and selecting, via a fifth MUX 895 controlled by the PRSG, which output of the at least two cryptographic operation blocks (e.g., AES calculator 810 or AES calculator 820) is fed back for a next round calculation.

Although the illustrated example incorporates the second example operation concealment configuration of FIG. 3, the described data extraction mitigation is applicable to other configurations, including but not limited to those shown in FIGS. 4 and 6. For example, instead of, or in addition to, using the block-unique-identifier, a device secret may be used to generate the modified input data. In addition, in some cases, the key may be modified in a different manner than the input data (e.g., the key is modified using the device secret and the input data is modified using the block pads).

As mentioned above, although detailed descriptions of implementations with PRSGs are shown, the described systems with operation concealment can use a truly random source or be programmatically sequenced. In some cases, a system can be used that calculates the sequence of random selections in advance (for example for each full AES electronic codebook ECB operation) loads the sequence into a shift register and shifts them out one at a time.

Although the illustrated configurations in FIGS. 2, 3, 4, 6, 7, and 8 are shown using discrete blocks, the cryptographic operation blocks and other blocks may be laid out as described with respect to the mitigation mechanism that locates parts of a circuit in different areas. For example, elements of one cryptographic operation block can be mixed with elements of the other cryptographic operation block so that from inspection of the chip, it is difficult to identify where one block is located. Indeed, as an example if there are four different AES round calculators, these four can be mixed together around a chip, making signal analysis more challenging for an attacker.

FIG. 9A illustrates an example operation concealment configuration for a cryptographic system with interweaved layout. Referring to FIG. 9A, an operation concealment configuration 900 with interweaved layout can implement any of the operation concealment configurations described above. In the illustrated example, operation concealment configuration 900 is similar to operation concealment configuration 200 of FIG. 2. For example, operation concealment configuration 900 includes two cryptographic operation blocks: a first cryptographic operation block 901 and a second cryptographic operation block 902 that use the same key 910 to perform calculations on data 920; and circuitry coupled to the at least two cryptographic operation blocks that route inputs and outputs pseudo randomly between the at least two cryptographic operation blocks. Each computation of a sequence of computations (e.g., round of cryptographic operations) is performed by one of the two cryptographic operation blocks 901, 902 according to a control signal from LFSR 930 and selection circuitry, such as a plurality of MUXs. The LFSR 930 provides the signal that controls which branch each MUX takes. For example, a first MUX 941 can be used to select whether the key 910 is input to the first cryptographic operation block 901 and a second MUX 942 can be used to select whether the key 910 is input to the second cryptographic operation block 902 under control of the LFSR 930. A third MUX 943 can be used to select which output is fed back for the next round calculation (or subsequent computation) under control of the LFSR 930.

To further conceal where cryptographic operations are being performed on a chip, a part 951 of the first cryptographic operation block 901 is interweaved with a part 952 of the second cryptographic operation block 902. The interweaving may be accomplished similar to the manner illustrated in FIG. 9B or 9C.

FIGS. 9B and 9C illustrate example representations of interweaving layouts for cryptographic operation blocks. Referring to FIG. 9B, a first cryptographic operation block 960 with subblocks 961, 962, 963, 964, 965, and 966 and a second cryptographic operation block 970 with subblocks 971, 972, 973, 974, 975, and 976 can be interweaved together in a region of a chip.

Figure 9C:
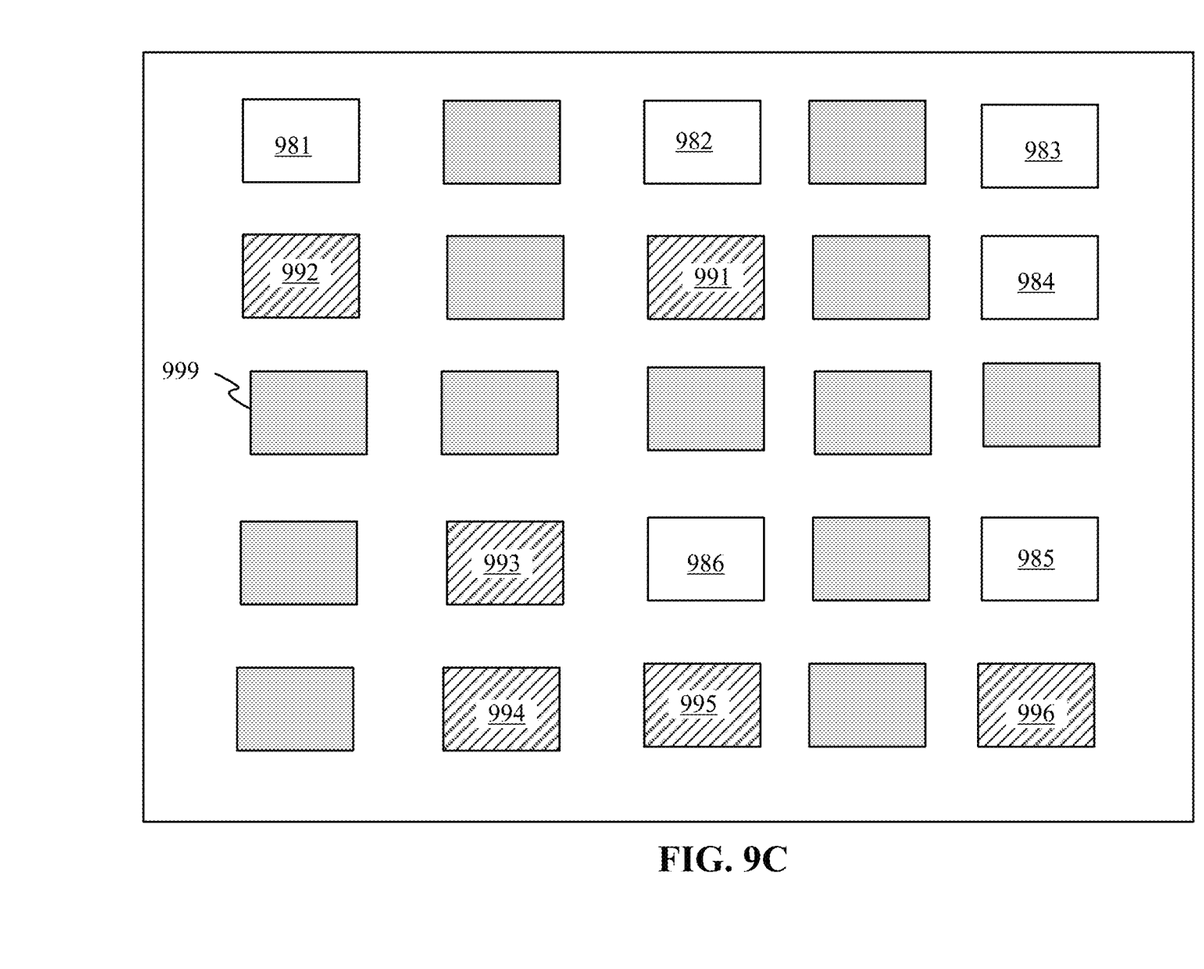

Referring to FIG. 9C, a first cryptographic operation block with subblocks (shown in white) 981, 982, 983, 984, 985, and 986 and a second cryptographic operation block with subblocks (shown in stripes) 991, 992, 993, 994, 995, and 996 can be interweaved together across a chip and interspersed with other blocks (shown in gray) 999. The other blocks 999 can be circuitry for other components of the system—either part of the operation concealment configuration or part of the system as a whole.

In some cases, a single cryptographic operation block is used to implement a cryptographic system such as the AES core configuration of FIG. 1. When a single cryptographic operation block is implemented, that single cryptographic operation block may be distributed with subblocks located between other blocks of the system such as illustrated in FIG. 9C. In addition, in some cases, a single cryptographic operation block can make use of a device secret, block pad, and/or counter.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:
   at least two cryptographic operation blocks;
   circuitry coupled to the at least two cryptographic operation blocks that route inputs and outputs between the at least two cryptographic operation blocks for subsequent computations wherein the circuitry comprises selection circuitry and a pseudorandom sequence generator (PRSG) that is coupled to the selection circuitry to control the selection circuitry;
   a first block pad for outputting a first block-unique-identifier;
   a second block pad for outputting a second block-unique-identifier;
   a first combiner coupled to the first block pad, a key output, and the selection circuitry for mixing the first block-unique-identifier with a key and outputting a first modified key to the selection circuitry, wherein the selection circuitry selects whether the key or the first modified key is output to a first cryptographic operation block of the at least two cryptographic operation blocks under control of the PRSG; and
   a second combiner coupled to the second block pad, the key output, and the selection circuitry for mixing the second block-unique-identifier with the key and outputting a second modified key to the selection circuitry, wherein the selection circuitry selects whether the key or the second modified key is output to a second cryptographic operation block of the at least two cryptographic operation blocks under control of the PRSG.

2. The system of claim 1, wherein each of the at least two cryptographic operation blocks perform operations at a same time, wherein the circuitry selects which output of the at least two cryptographic operation blocks is used for the subsequent computations.

3. The system of claim 1, wherein the at least two cryptographic operation blocks comprise:
   a first cryptographic operation block; and
   a second cryptographic operation block;
   wherein the selection circuitry comprises:
      a first multiplexer (MUX);
      a second MUX; and
      a third MUX;
      wherein the PRSG is coupled to the first MUX, the second MUX, and the third MUX to select which input of each MUX is output;
      wherein the third MUX selects which output from the first cryptographic operation block and the second cryptographic operation block is fed back for a subsequent computation.

4. The system of claim 1, further comprising:
   a third combiner coupled to the first block pad, input data, and the selection circuitry for mixing the first block-unique-identifier with the input data and outputting a first modified input data to the selection circuitry, wherein the selection circuitry selects whether the input data or the first modified input data is output to the first cryptographic operation block of the at least two cryptographic operation blocks under control of the PRSG; and
   a fourth combiner coupled to the second block pad, the input data, and the selection circuitry for mixing the second block-unique-identifier with the input data and outputting a second modified input data to the selection circuitry, wherein the selection circuitry selects whether the input data or the second modified input data is output to the second cryptographic operation block of the at least two cryptographic operation blocks under control of the PRSG.

5. The system of claim 1, further comprising:
a counter;
a third combiner coupled to the counter, the first block pad, and the first combiner for mixing an output of the counter with the first block-unique-identifier before the first block-unique-identifier is mixed with the key by the first combiner; and
a fourth combiner coupled to the counter, the second block pad, and the second combiner for mixing the output of the counter with the second block-unique-identifier before the second block-unique-identifier is mixed with the key by the second combiner.

6. The system of claim 1, wherein a cryptographic operation block of the at least two cryptographic operation blocks comprises a plurality of first subblocks, wherein the first subblocks of the cryptographic operation block are distributed across a chip with other blocks between them.

7. The system of claim 1, wherein a first cryptographic operation block of the at least two cryptographic operation blocks comprises a plurality of first subblocks and a second cryptographic operation block of the at least two cryptographic operation blocks comprises a plurality of second subblocks, wherein the first subblocks and the second subblocks are interweaved.

8. A system comprising:
at least two cryptographic operation blocks;
circuitry coupled to the at least two cryptographic operation blocks that route inputs and outputs between the at least two cryptographic operation blocks for subsequent computations, wherein the circuitry comprises selection circuitry and a pseudorandom sequence generator (PRSG) that is coupled to the selection circuitry to control the selection circuitry;
a device secret output for outputting a device secret; and
a combiner coupled to the device secret output, a key output, and the selection circuitry for mixing the device secret with a key from the key output and outputting a modified key to the selection circuitry, wherein the selection circuitry selects whether the key or the modified key is output to each of the at least two cryptographic operation blocks under control of the PRSG.

9. The system of claim 8, further comprising:
a counter; and
a third combiner coupled to the counter, the device secret output, and the combiner for mixing an output of the counter with the device secret before the device secret is mixed with the key by the combiner.

10. The system of claim 8, wherein each of the at least two cryptographic operation blocks perform operations at a same time, wherein the circuitry selects which output of the at least two cryptographic operation blocks is used for the subsequent computations.

11. The system of claim 8, wherein the at least two cryptographic operation blocks comprise:
a first cryptographic operation block; and
a second cryptographic operation block;
wherein the selection circuitry comprises:
a first multiplexer (MUX);
a second MUX; and
a third MUX;
wherein the PRSG is coupled to the first MUX, the second MUX, and the third MUX to select which input of each MUX is output;
wherein the third MUX selects which output from the first cryptographic operation block and the second cryptographic operation block is fed back for a subsequent computation.

12. The system of claim 8, wherein a cryptographic operation block of the at least two cryptographic operation blocks comprises a plurality of first subblocks, wherein the first subblocks of the cryptographic operation block are distributed across a chip with other blocks between them.

13. The system of claim 8, wherein a first cryptographic operation block of the at least two cryptographic operation blocks comprises a plurality of first subblocks and a second cryptographic operation block of the at least two cryptographic operation blocks comprises a plurality of second subblocks, wherein the first subblocks and the second subblocks are interweaved.

14. A system comprising:
at least two cryptographic operation blocks;
circuitry coupled to the at least two cryptographic operation blocks that route inputs and outputs between the at least two cryptographic operation blocks for subsequent computations, wherein the circuitry comprises selection circuitry and a pseudorandom sequence generator (PRSG) that is coupled to the selection circuitry to control the selection circuitry;
a first block pad for outputting a first block-unique-identifier;
a second block pad for outputting a second block-unique-identifier;
a device secret output for outputting a device secret;
a counter; and
one or more combiners coupled to a key output, the counter, the device secret output, the first block pad, and the second block pad to derive a corresponding output, including a modified key,
wherein the selection circuitry is coupled to receive the modified key and the key output and select whether a key from the key output or the modified key is output to a first cryptographic operation block and a second cryptographic operation block of the at least two cryptographic operation blocks under control of the PRSG.

15. The system of claim 14, wherein each of the at least two cryptographic operation blocks perform operations at a same time, wherein the circuitry selects which output of the at least two cryptographic operation blocks is used for the subsequent computations.

16. The system of claim 14, wherein the at least two cryptographic operation blocks comprise:
a first cryptographic operation block; and
a second cryptographic operation block;
wherein the selection circuitry comprises:
a first multiplexer (MUX);
a second MUX; and
a third MUX;
wherein the PRSG is coupled to the first MUX, the second MUX, and the third MUX to select which input of each MUX is output;
wherein the third MUX selects which output from the first cryptographic operation block and the second cryptographic operation block is fed back for a subsequent computation.

17. The system of claim 14, wherein a cryptographic operation block of the at least two cryptographic operation blocks comprises a plurality of first subblocks, wherein the first subblocks of the cryptographic operation block are distributed across a chip with other blocks between them.

18. The system of claim 14, wherein a first cryptographic operation block of the at least two cryptographic operation blocks comprises a plurality of first subblocks and a second cryptographic operation block of the at least two cryptographic operation blocks comprises a plurality of second subblocks, wherein the first subblocks and the second subblocks are interweaved.

* * * * *